United States Patent
Galletti

(10) Patent No.: US 6,789,663 B2
(45) Date of Patent: Sep. 14, 2004

(54) ROTATING CONVEYOR FOR EVACUATING METALLIC SHAVINGS RESULTING FROM MECHANICAL WORK PROCESSES

(75) Inventor: Alfonso Galletti, Turin (IT)

(73) Assignee: GI. PI. S.r.l., Turin (IT)

( * ) Notice: Subject to any disclaimer, the term of this patent is extended or adjusted under 35 U.S.C. 154(b) by 16 days.

(21) Appl. No.: 10/372,294

(22) Filed: Feb. 25, 2003

(65) Prior Publication Data

US 2004/0118660 A1 Jun. 24, 2004

(30) Foreign Application Priority Data

Dec. 18, 2002 (IT) .................................... TO2002A1095

(51) Int. Cl.⁷ ........................ B65G 35/00; B65G 53/08; B65G 53/48; A01D 87/10
(52) U.S. Cl. .................... 198/722; 198/803.16; 406/57; 406/102
(58) Field of Search ................................. 198/722, 453, 198/803.16; 406/52, 54, 57, 65, 96, 102

(56) References Cited

U.S. PATENT DOCUMENTS

| | | | | |
|---|---|---|---|---|
| 2,498,143 A | * | 2/1950 | Struckmann | 406/58 |
| 4,661,024 A | * | 4/1987 | Hafner | 406/63 |
| 5,255,830 A | * | 10/1993 | Hafner | 222/370 |
| 5,356,280 A | * | 10/1994 | Ponzielli | 425/201 |
| 5,904,452 A | * | 5/1999 | Kress | 408/57 |
| 6,416,261 B2 | * | 7/2002 | Martin | 406/128 |
| 6,685,007 B1 | * | 2/2004 | Gustavsson | 198/723 |

\* cited by examiner

*Primary Examiner*—Gene O. Crawford
(74) *Attorney, Agent, or Firm*—Sughrue Mion, PLLC

(57) ABSTRACT

Rotating conveyor for the evacuation of metallic shavings resulting from mechanical work processes comprising a collection container in which is able to rotate a motorised bucket above whose bottom wall is positioned the lower end of an evacuation conduit connected to an aspiration unit, for instance pneumatic. A stationary conveying member extends between the vertical axis of rotation of the bucket and the lower end of the evacuation conduit to convey the shavings below it.

10 Claims, 2 Drawing Sheets

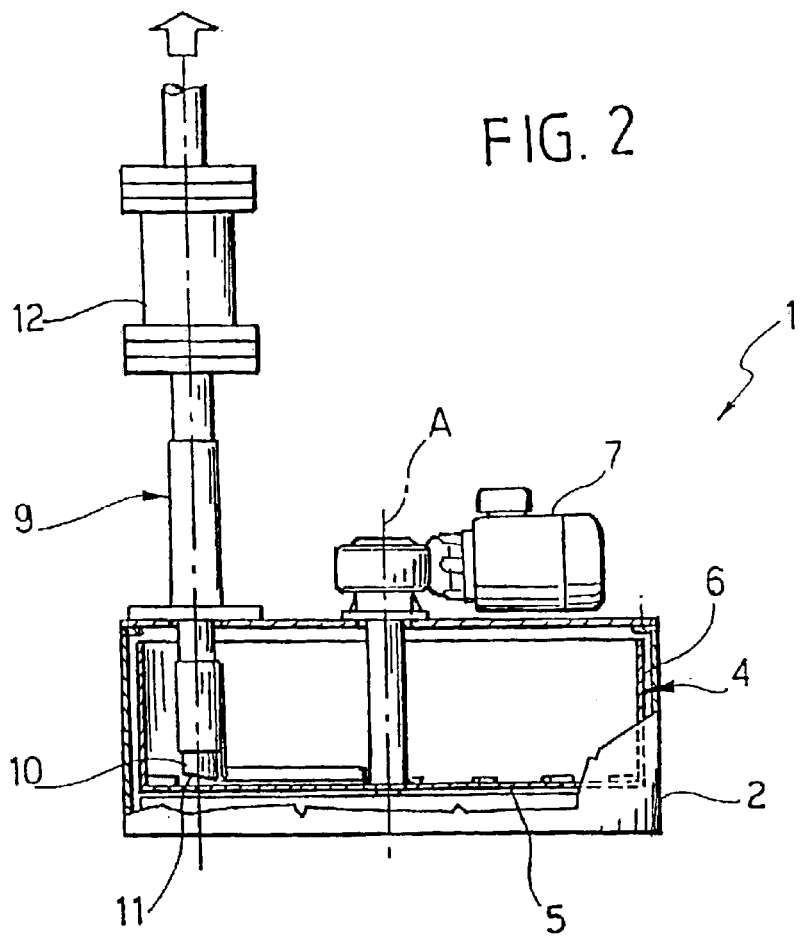
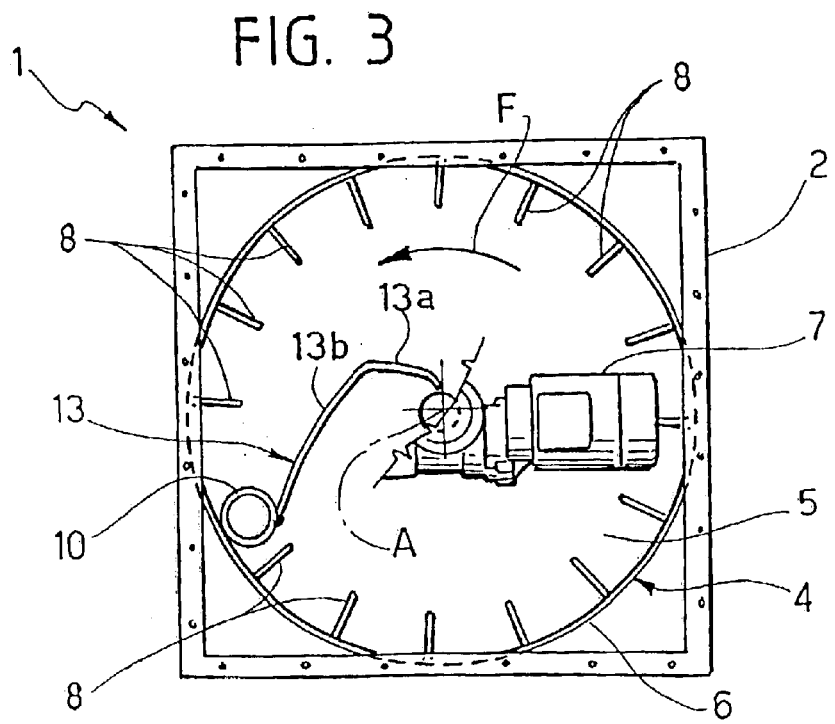

ROTATING CONVEYOR FOR EVACUATING METALLIC SHAVINGS RESULTING FROM MECHANICAL WORK PROCESSES

FIELD OF THE INVENTION

The present invention relates to plants for mechanical processing by means of cutting machine tools, and more in particular it pertains to a device for evacuating the metallic shavings resulting from said metallic work processes.

STATE OF THE PRIOR ART

Traditionally, the shavings resulting from machine tools are subjected to treatments for removing any oil and triturating, and then collected in appropriate evacuation containers. This solution is clearly not very practical due to the need to handle such containers, which are normally heavy and bulky.

According to another known solution, the shavings are sent to motorised evacuating conveyors, which can be floor mounted or buried in the floor: this solution, in addition to being complicated and costly, has flexibility problems because it imposes rigid constraints relating to the arrangement of the machine tools and entails severe limitations if said arrangement is subsequently modified.

SUMMARY OF THE INVENTION

The object of the present invention is to overcome the aforesaid drawbacks, and to provide a device for evacuating metallic shavings that is simple and economical to obtain and is highly practical and flexible in use.

According to the invention said aim is achieved by means of a rotating evacuating conveyor comprising a collection container having an opening for the entry of the shavings, a bucket rotatably mounted in the collection container about a vertical axis and having a bottom wall situated underneath said inlet opening, motor means for operating rotation of the bucket, an evacuation conduit connected to an aspiration unit and having a lower end terminating within said collection container above said bottom wall in an offset position relative to said vertical axis, and a stationary conveying member designed, during rotation of the bucket, to convey the shavings below said lower end of the evacuation conduit.

The aspiration unit is advantageously pneumatic (vacuum pump) but, alternatively, it can also consist of a hydraulic pump. In the second case, the shavings may be inserted into the collection container of the device even without being previously subjected to an oil removal treatment.

According to a preferred embodiment of the invention, the bottom wall of the bucket has a plurality of substantially radial projections, having the function of moving, during the rotation of the bucket, the shavings concentrated in the area of the lower end of the evacuation conduit. Moreover, the conveying member is advantageously constituted by a shaped blade extending, immediately above the bottom wall of the bucket, between said vertical axis and said lower end of the evacuation conduit.

The evacuation conduit can advantageously be provided with a shut-off valve, for instance a pneumatic valve with flexible hose, set cyclically to open and shut communication between the aspiration unit and the collection container of the device, possibly in synchronism with the activation of the motorised means for operating the rotation of the bucket.

BRIEF DESCRIPTION OF THE DRAWINGS

The invention will now be described in detail with reference to the accompanying drawings, provided purely by way of non limiting example, in which:

FIG. 2 is an elevation and partly sectioned view of FIG. 1, and FIG. 3 is a fragmentary and simplified top plan view of FIG. 2.

DETAILED DESCRIPTION OF THE INVENTION

Figure 1:
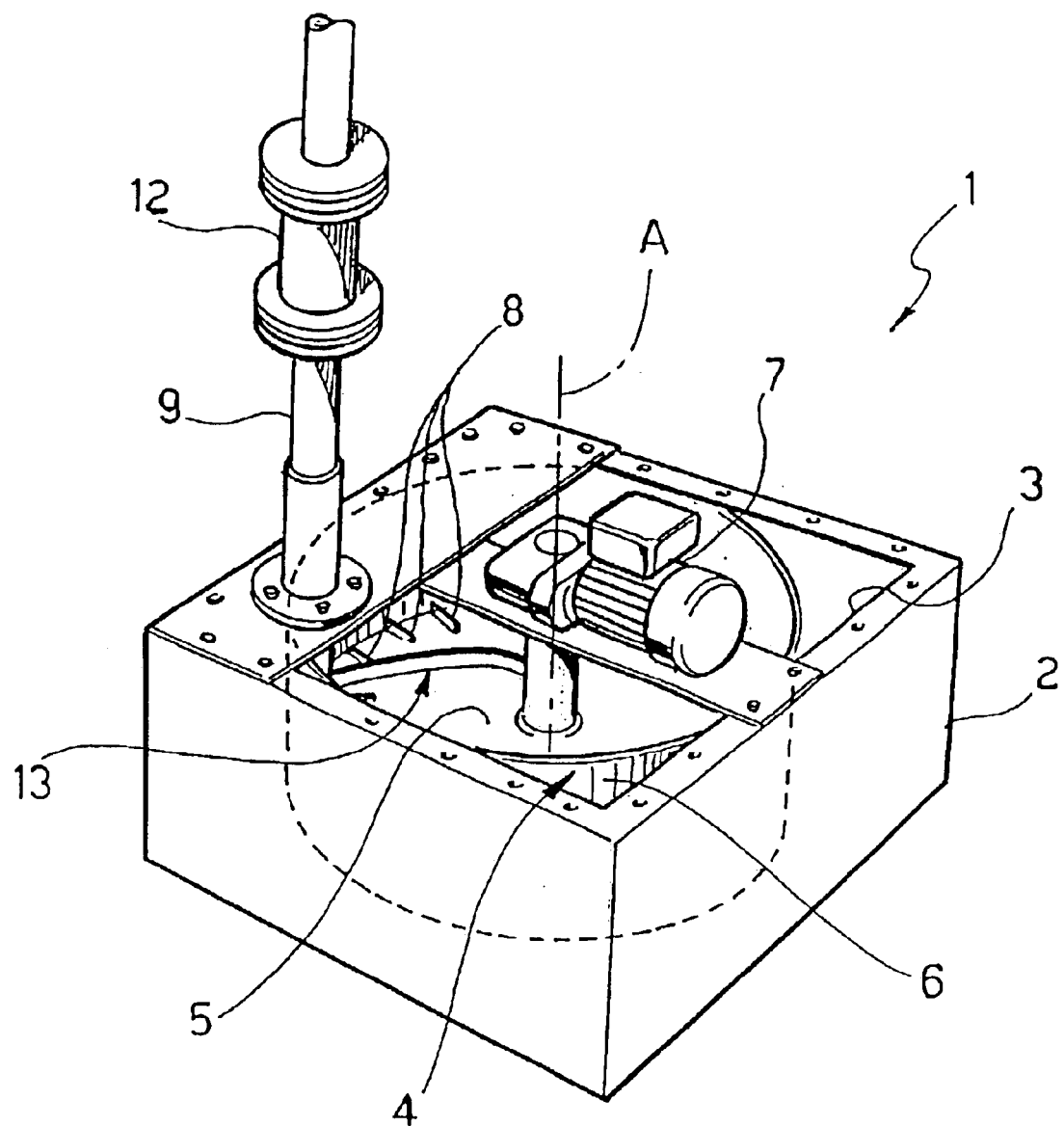
FIG. 1 is a schematic perspective view of a rotating conveyor for evacuating shavings according to the invention.

With reference to the drawings, the number 1 globally indicates a device with rotating conveyor for the pneumatic evacuation of metallic shavings coming from cutting machine tools. The device 1 can be advantageously associated operatively to a self-feeding shredder device of the type described and illustrated in European patent application EP-A-1151822 by the same Applicant.

The device 1 according to the invention essentially comprises a collection container 2, for instance with generally parallelepiped shape, having an upper opening 3 through which the triturated shavings are fed by gravity (or with a different insertion system) to a bucket 4 mounted so as to rotate inside the collection container 2 about a vertical axis A. The bucket 4, which has a generally cylindrical shape with a horizontal bottom wall 5 and a lateral shell 6, is commanded to rotate in continuous fashion, or in steps or else in intermittent fashion, by means of a gearmotor 7 positioned above the collection container 2.

As FIG. 3 shows more clearly, the bottom wall 5 of the bucket 4 has a plurality of substantially radial projections 8 positioned in correspondence with its periphery. Naturally, the number and the arrangement of the projections 8 may vary relative to what is illustrated by way of example in the figures.

The reference number 9 designates an evacuation conduit connected to a pneumatic aspiration unit, not shown, but readily understandable by the person versed in the art, advantageously through a pipeline or a network of aerial pipelines. The evacuation conduit 9 extends vertically within the collection container 2 and has a lower end 10 positioned immediately above the bottom wall 5 in an offset position relative to the vertical axis of rotation A of the bucket 4. Said position corresponds to the periphery of the bottom wall 5 bearing the projections 8.

The lower end 10 of the evacuation conduit 9 advantageously has a chamfered edge 11.

The reference number 12 indicates a shut-off valve whereby communication between the aspiration unit and the interior of the collection container 4 can be opened and shut cyclically, advantageously in synchronism with the activation and deactivation of the gearmotor 7.

In the case of the illustrated embodiment, the shut-off valve 12 is a pneumatic valve with flexible hose: however, different shut-off valves may be employed.

The reference number 13 designates a stationary conveying baffle member constituted by a shaped blade positioned immediately above the bottom wall 5 of the bucket 4 between the vertical axis A and the lower end 10 of the evacuation conduit 9. The conveyor blade 13 has, in the case of the illustrated embodiment, a general "L" shape with a shorter branch 13a extending substantially radially starting from the vertical axis A, and a longer branch 13b positioned obliquely between said smaller branch 13a and the lower end 10 of the evacuation conduit 9.

In operation, the triturated shavings fed into the collection container 2 through the upper opening 3 are deposited on the bottom wall 5 of the bucket 4. When the gearmotor 7 is activated, the bucket 4 is made to rotate in the direction indicated in the arrow F in FIG. 3, in such a way as to transfer the shavings towards the conveying blade 13 thus concentrating them, by means of said blade, underneath the lower end 10 of the evacuation conduit 9. The radial projections 8 act, during the rotation of the bucket 4, in such a way as to move the shavings, accumulated and concentrated by the blade 13 underneath the end 10. When the valve 12 is cyclically opened, the lower end 10 of the conduit 9 is placed in communication with the aspiration unit, thus removing the shavings from the collection container 2 and transferring them to the aerial evacuation system.

According to a variant of the invention, not shown in the drawings, the unit for the aspiration of the shavings can be hydraulic instead of pneumatic. In this case the hydraulic pump will be positioned for instance inside the rotating bucket 4, and the shavings may be inserted into the collection container 2 even without being previously subjected to an oil removal treatment.

Naturally, the construction detail and the embodiments may be varied widely with respect to what is described and illustrated herein, without thereby departing from the scope of the present invention as defined in the claims that follow.

What is claimed is:

1. A rotating conveyor for evacuating metallic shavings resulting from mechanical work processes, comprising a collection container having an opening for the entry of the shavings, a bucket rotatably mounted in said collection container about a vertical axis and having a bottom wall situated underneath said entry opening, motor means for operating rotation of said bucket, an evacuation conduit connected to an aspiration unit and having a lower end terminating within said collection container above said bottom wall in an offset position relative to said vertical axis, and a stationary conveying member designed, during rotation of said bucket, to convey the shavings below said lower end of said evacuation conduit.

2. Rotating conveyor as claimed in claim 1, wherein said lower end of said evacuation conduit has a chamfered shape.

3. Rotating conveyor as claimed in claim 1, wherein said aspiration unit is pneumatic.

4. Rotating conveyor as claimed in claim 1, wherein said aspiration unit is hydraulic.

5. Rotating conveyor as claimed in claim 1, wherein said bottom wall of the bucket has a plurality of substantially radial projections.

6. Rotating conveyor as claimed in claim 5 wherein said projections are positioned along the perimeter of the bottom wall of the bucket.

7. Rotating conveyor as claimed in claim 1, wherein said evacuation conduit is provided with a shut-off valve.

8. Rotating conveyor as claimed in claim 7, wherein said shut-off valve is a pneumatic valve with flexible hose.

9. Rotating conveyor as claimed in claim 1, wherein said conveying member comprises a shaped baffle blade positioned immediately above said bottom wall of the bucket between said vertical axis and said lower end of the evacuation conduit.

10. Rotating conveyor as claimed in claim 9, wherein said conveyor blade is generally "L" shaped.

* * * * *